(12) United States Patent
Ta

(10) Patent No.: US 7,950,211 B1
(45) Date of Patent: May 31, 2011

(54) POWER TOOL FOR FACILITATING AN OPERATOR'S ALTERNATIVE CUTTING OF FOLIAGE OVER THE GROUND AND ALONG THE GROUND

(76) Inventor: Scott Ta, Wichita, KS (US)

( * ) Notice: Subject to any disclaimer, the term of this patent is extended or adjusted under 35 U.S.C. 154(b) by 0 days.

(21) Appl. No.: 12/855,571

(22) Filed: Aug. 12, 2010

(51) Int. Cl.
*A01D 34/00* (2006.01)
(52) U.S. Cl. .................................................. 56/12.7
(58) Field of Classification Search ............ 56/12.7, 56/16.7, 17.2, 13.7, 13.5; 280/43; 172/14; D15/17
See application file for complete search history.

(56) References Cited

U.S. PATENT DOCUMENTS

| | | | | |
|---|---|---|---|---|
| 2,485,312 A | * | 10/1949 | Powell | 56/253 |
| 2,828,968 A | * | 4/1958 | Engler | 280/43 |
| 3,330,102 A | | 7/1967 | Shuman, Jr. | |
| 3,350,864 A | | 11/1967 | Sheps et al. | |
| 3,561,199 A | | 2/1971 | Lay | |
| 3,603,162 A | | 9/1971 | Gohler | |
| 3,672,139 A | | 6/1972 | Duran et al. | |
| 3,871,160 A | | 3/1975 | Hooper | |
| 4,442,659 A | * | 4/1984 | Enbusk | 56/12.7 |
| 4,718,221 A | | 1/1988 | Wessel et al. | |
| 4,936,886 A | * | 6/1990 | Quillen | 56/16.7 |
| 5,355,664 A | * | 10/1994 | Zenner | 56/15.8 |
| 5,463,855 A | * | 11/1995 | Johnson et al. | 56/17.2 |
| 5,626,006 A | * | 5/1997 | Fricke, Sr. | 56/12.7 |
| 5,694,752 A | * | 12/1997 | Warfield, III | 56/13.6 |
| 5,775,074 A | | 7/1998 | Walter | |
| 5,787,693 A | | 8/1998 | Dyke | |
| 5,826,414 A | | 10/1998 | Lenczuk | |
| 5,829,236 A | * | 11/1998 | Ballard et al. | 56/16.7 |
| 5,884,462 A | * | 3/1999 | Gerber | 56/12.1 |
| 5,970,692 A | * | 10/1999 | Foster | 56/12.1 |
| 6,256,970 B1 | | 7/2001 | Fleener | |
| 6,651,415 B2 | * | 11/2003 | Burke | 56/17.2 |
| 6,895,735 B2 | | 5/2005 | Gallentine | |
| 6,899,345 B1 | * | 5/2005 | Bearden | 280/43 |
| 6,938,699 B2 | | 9/2005 | Templeton et al. | |
| 6,966,168 B1 | * | 11/2005 | Kerr, Sr. | 56/12.7 |
| 6,986,238 B1 | * | 1/2006 | Bloodworth | 56/12.7 |
| 7,028,455 B1 | * | 4/2006 | Liguras | 56/13.6 |
| 7,107,745 B2 | * | 9/2006 | Dunda | 56/12.7 |
| 7,644,565 B2 | * | 1/2010 | Uihlein | 56/13.7 |
| D616,904 S | * | 6/2010 | Armstrong | D15/17 |
| 2002/0174639 A1 | | 11/2002 | Fowler | |
| 2003/0093983 A1 | * | 5/2003 | Savard et al. | 56/12.7 |
| 2003/0159418 A1 | * | 8/2003 | Lin | 56/14.7 |
| 2006/0021314 A1 | * | 2/2006 | Hatfield | 56/12.7 |

FOREIGN PATENT DOCUMENTS

WO    WO 9117649    11/1991

* cited by examiner

*Primary Examiner* — Árpád Fábián-Kovács
(74) *Attorney, Agent, or Firm* — Kenneth H. Jack; Davis & Jack, L.L.C.

(57) ABSTRACT

A power tool for facilitating an operator's cutting of foliage over and along the ground, the tool including a case; a tubular shaft fixedly attached to and extending forwardly from the case; a flexible line trimmer head mounted at the tubular shaft's distal end; a motor housed within the case; an axle linking the flexible line trimmer head with the motor, the axle extending through the tubular shaft; and a handle and wheeled carriage combination connected operatively to case, the handle and wheeled carriage combination being adapted for alternatively facilitating manual movement of the case, tubular shaft, trimmer head, motor, and axle during the operator's over the ground foliage cutting, and facilitating rolling movement of the case, tubular shaft, trimmer head, motor, and axle during the operator's along the ground foliage cutting.

15 Claims, 2 Drawing Sheets

POWER TOOL FOR FACILITATING AN OPERATOR'S ALTERNATIVE CUTTING OF FOLIAGE OVER THE GROUND AND ALONG THE GROUND

FIELD OF THE INVENTION

This invention relates to power tools. More particularly, this invention relates to power tools which are adapted for cutting and trimming grass, weeds, brush, bushes, and hedges.

BACKGROUND OF THE INVENTION

Rotary flexible line foliage trimmers are commonly known. Such trimmers are commonly carried upon a wheeled deck having an upwardly and rearwardly extending handle, and having a gas powered or electric powered motor housed within a case which forwardly extends a rotary flexible line trimmer head. Such wheeled and powered foliage trimming tools typically effectively cut and trim grass and weeds at ground level by facilitating rollable movement of the tool and its attached trimmer head over the ground, such head cutting grass and weeds along the ground in a horizontal plane or cutting swathe.

Such wheeled foliage cutting tools typically are either incapable of performing sidewalk and curb edge trimming, or such tools are typically difficultly reconfigurable for performance of such edging cutting functions. Such wheeled foliage cutting tools also are typically incapable of cutting bush and shrub foliage at any useful or significant elevation over the ground.

The instant inventive power tool for facilitating an operator's alternative cutting of foliage over the ground and along the ground solves or ameliorates the problems, defects, and deficiencies discussed above by providing the multiply functional wheeled carriage and trimmer unit combination which alternatively facilitate along the ground horizontal swathe foliage cutting, along the ground curb and sidewalk edge foliage cutting, and above the ground bush and shrub trimming.

BRIEF SUMMARY OF THE INVENTION

A first structural component of the instant inventive power tool for facilitating an operator's alternative cutting of foliage over the ground and along the ground comprises a hollow case. In a preferred embodiment, the hollow case comprises high impact injection molded plastic and has a circular cylindrical configuration. The preferred cylindrical configuration of the case component may suitably alternatively have an octagonal cross-sectional profile, a hexagonal cross-section profile, a rectangular or square cross-sectional profile.

A further structural component of the instant inventive power tool comprises a tubular trimmer head supporting shaft whose proximal end is preferably fixedly and rigidly attached to a forward end of the case. The tubular shaft preferably comprises steel, has a forwardly extending portion at its proximal end, and has a cantilevering portion at its distal end. Preferably, the tubular shaft arcuately transitions from its proximal end to its distal end at a 90° angle for facilitating re-orienting of the trimmer unit with respect to the wheeled carriage between a horizontal swathe cutting configuration and a curb edging configuration.

A further structural component of the instant inventive tool preferably comprises the flexible line trimmer head which is rotatably mounted at the tubular's shaft extreme distal end. In a preferred embodiment, the flexible line trimmer head constitutes a continuous trimmer line feeding head. Suitably, the flexible line trimmer head may alternatively comprise a rotary head of the conventional type which operates via an operator's manual interchange of short flexible line segments.

A further structural component of the instant inventive power tool preferably comprises motor means which are operatively housed within the hollow interior space of the case. Suitably, the motor means comprise a DC electric motor and electrical storage battery combination wherein the motor comprises an 18 volt, 24 volt or 36 volt motor, and wherein the battery comprises a rechargeable NiCad (nickle cadmium) or lithium ion battery. Also suitably, the motor means may alternatively comprise an AC electrical motor served by an exterior power cord. Also suitably, the motor means may comprise a two cycle gasoline powered internal combustion engine. Regardless of which motor means is mounted within the case, the motor means necessarily presents a rotary power output.

A further structural component of the instant inventive power tool preferably comprises an axle which operatively links the rotary trimmer head with the motor means' rotary power output, the axle preferably extending through the hollow bore of the tubular shaft. In a preferred embodiment, the axle comprises a flexible drive cable which bendably conforms with and extends along the preferably curved interior bore of the tubular shaft.

A further structural component of the instant inventive power tool preferably comprises wielding means which are connected operatively to the case. Preferably, the wielding means are adapted for alternatively facilitating direct manually actuated or carried movement of the case, tubular shaft, flexible line trimmer head, motor means, and axle during the operator's over the ground foliage cutting (of bushes, shrubs, and the like) and facilitating rolling movement of such trimmer unit components during the operator's along the ground (i.e., horizontal swathe cutting and edging) foliage cutting.

In a preferred embodiment, the adaptation of the wielding means which facilitates the over the ground manually actuated movement comprise handle means which are directly operatively connected to the case. In a preferred embodiment, such handle means comprise a pair of grips and grip attaching means, the grip attaching means positioning the grips upon the case for ergonomic two handed manual control. The wielding means' adaptation for facilitating along the ground foliage cutting preferably comprise a wheeled carriage, and attaching and re-orienting means for alternatively attaching the case to the wheel carriage and releasing the case from the carriage for direct manual control or for re-orienting of the trimmer unit upon the carriage. Upon attachment of the trimmer unit to the carriage, the operator may rollably move the carriage via a preferably provided push handle for wielding and moving the unit including the trimmer head along the ground for cutting and edge trimming of ground level grasses and weeds.

Accordingly, it is an object of the instant invention to provide a power tool for facilitating an operator's alternative cutting of foliage over the ground and along the ground which incorporates structures as described above, and which arranges those structures with respect to each other in manners described above for performance of the beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
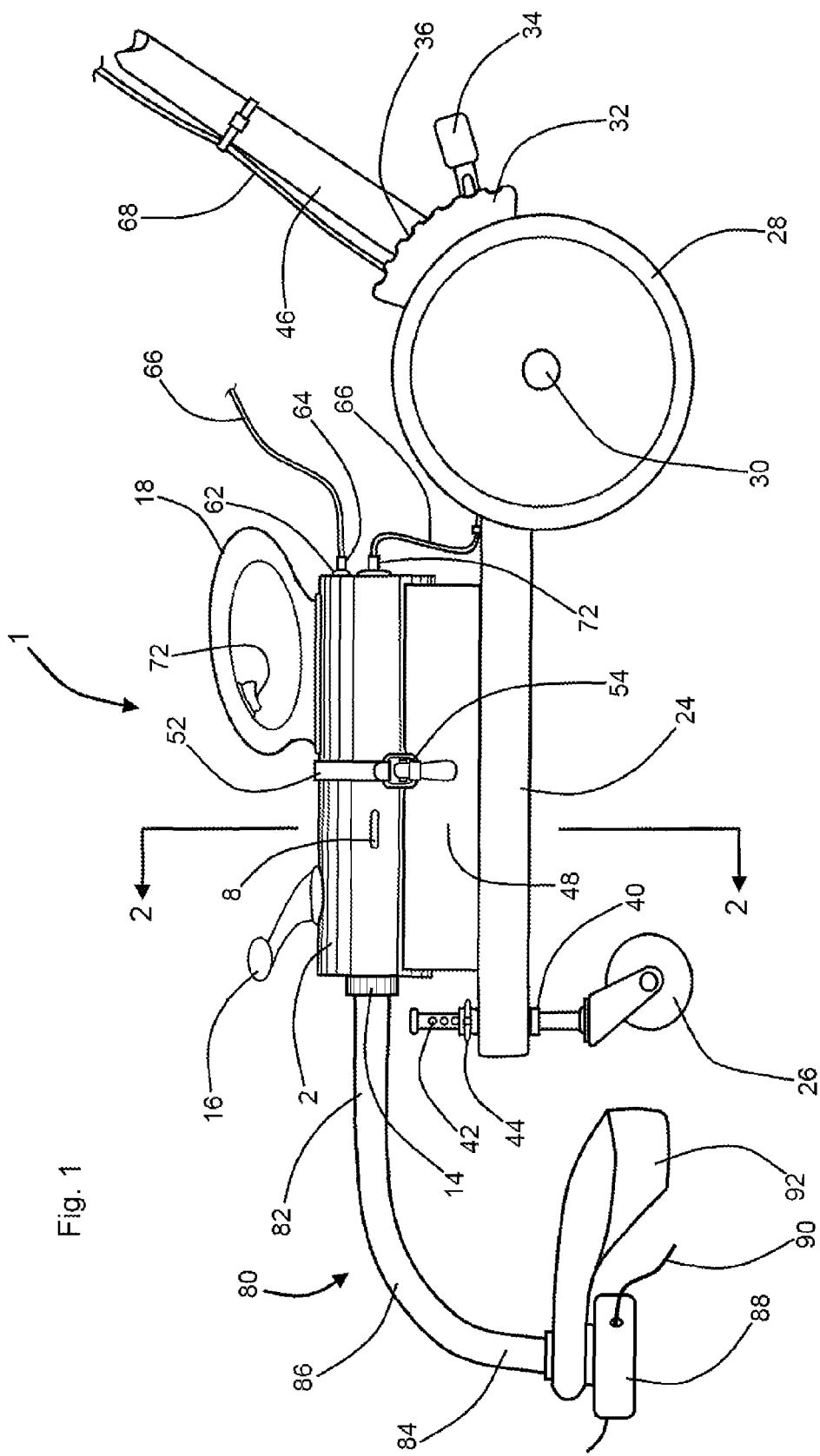
FIG. 1 is a side view of a preferred embodiment of the instant inventive power tool for facilitating an operator's alternative cutting of foliage over the ground and along the ground.

Referring now to the drawings, and in particular to FIG. 1, a preferred embodiment of the instant inventive power tool for facilitating an operator's alternative cutting of foliage over the ground and along the ground is referred to generally by Reference Arrow 1. The power tool 1 preferably comprises a case 2 which, referring further to FIG. 2, defines a hollow interior space 4. In the depicted preferred embodiment, the case 2 has a substantially circular lateral cross-sectional profile. Such circular profile is intended as being representative of other suitable geometric profiles, such as octagonal, hexagonal, square, or rectangular. The forward end of the case 2 is preferably closed and has a plurality of vents 6 for air cooling of heat generating components which are housed within the case 2. In a preferred embodiment, the case 2 is composed of durable high impact plastic and presents a plurality of radially spaced position locking ridges 8, 10, and 12. The forward end of the case 2 preferably presents a shaft mounting and supporting member 14.

Figure 2:
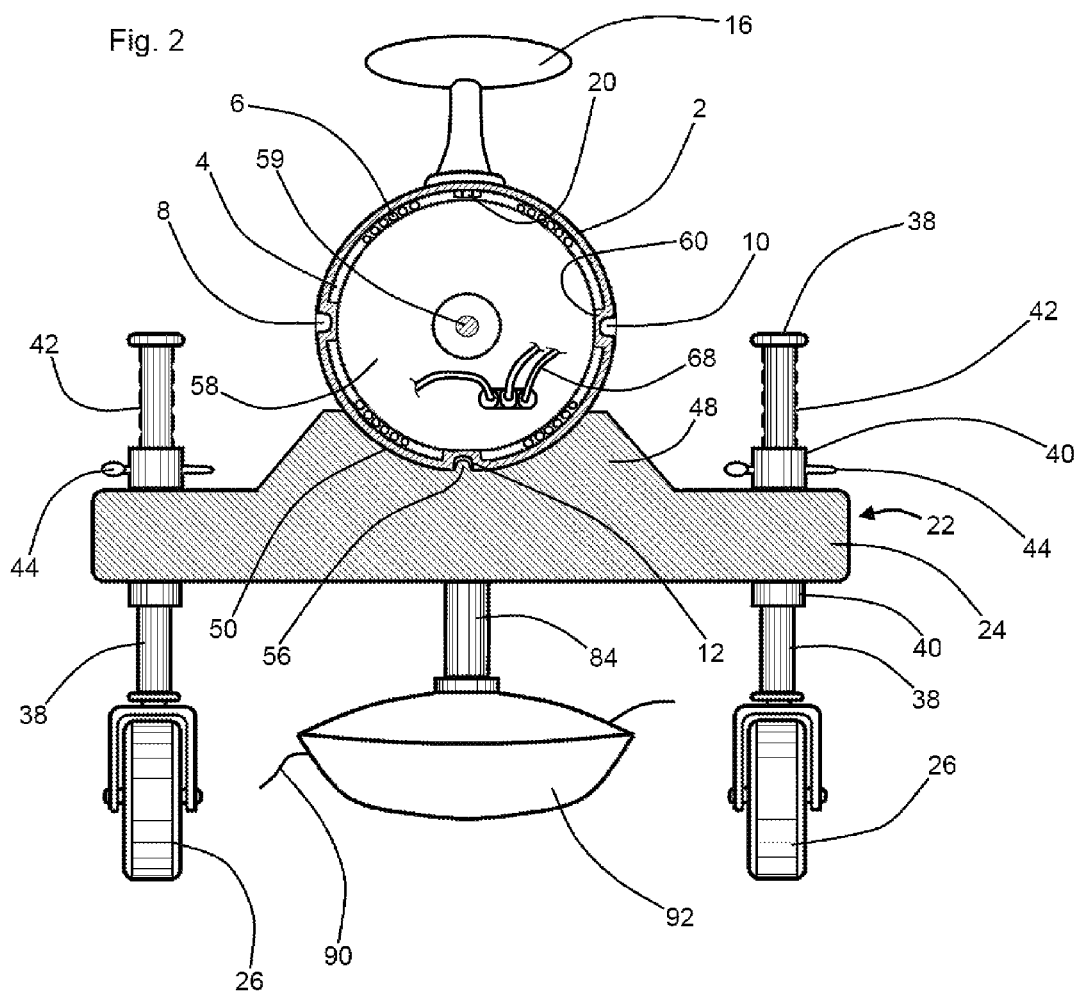
FIG. 2 is a sectional view as indicated in FIG. 1.

Referring further simultaneously to FIGS. 1 and 2, wielding means are preferably mechanically associated with the case 2, the wielding means preferably being adapted for alternatively facilitating above the ground flexible line trimming of foliage, and along the ground flexible line trimming of foliage. For facilitating the above the ground flexible line foliage trimming, the wielding means preferably comprise handle means which are connected operatively to the case, the handle means preferably comprising front and rear grips 16 and 18, and grip attaching means 20. As is depicted in FIG. 2, the grip attaching means may comprise helically threaded lug, eye, and nut combinations 20 which interconnect the grips 16 and 18 with the case 2. Suitably, the grip attaching means may alternatively comprise whole formations of the front and rear grips 16 and 18 with the case 2.

Referring simultaneously to FIGS. 1 and 2, the adaptation of the wielding means for alternatively facilitating the along the ground foliage cutting preferably comprises a wheeled carriage which is referred to generally by Reference Arrow 22. In a preferred embodiment, the wheeled carriage comprises a deck 24, a pair of front wheels 26, and a pair of rear wheels 28. The rear wheels 28 are preferably rotatably mounted upon the deck 24 in a conventional fashion via a laterally extending axle 30. A conventional left or right height adjusting bracket assembly 32 is preferably mechanically associated with the rear wheels 28 and axle 30, such assembly having a pivoting lever 34 which is movable along and selectively engageable with a series of height adjustment slots 36. The wheeled carriage's height adjustment means suitably further comprises a pair of vertically extending caster shafts 38 which extend through sleeves 40 which are mounted within and pass vertically through the front left and front right corners of the deck 24. According to such height adjustment means, pluralities of vertically arrayed shear pin receiving eyes 42 within the shafts 38 may align with similar eyes within the sleeves 40 for engagement with insertable and removable shear pins 44 for selective adjustments of the vertical positions of the left and right castor wheels 26 beneath the deck 24. The pivoting lever height adjustment means applicable to the rear wheels 28 and the sleeve and shaft height adjustment means applicable to the casters 26 are intended as being representative of numerous other commonly known wheeled height adjustment means which may be applied to decks of the wheeled carriages.

Referring further simultaneously to FIGS. 1 and 2, the wheeled carriage 22 facilitates the wielding means' adaptation for along the ground foliage cutting via provision of a conventional push handle 46 which is fixedly attached to and extends upwardly and rearwardly from the rearward end of the deck 24, the upper end (not depicted within views) of such handle 46 preferably presenting horizontally extending hand gripping surfaces typical of such conventional push handles.

The wielding means preferably further comprise attaching means for fixedly interconnecting the case 2 and the deck 24. In a preferred embodiment, the attaching means comprise a cradle 48 which presents an upwardly opening concavity 50 which is closely fitted for nestingly receiving radial portions of the annular outer surface of the case 2. Such attaching means preferably further comprise an alternatively engageable and disengageable mounting bracket which, as depicted, includes a pivoting "U" shaped over arching loop 52 in combination with an over center latch 54. Such loop 52 and over center latch 54 are representative of numerous other mechanical fasteners which are capable of alternatively securing the case 2 within the concavity 50 of the cradle 48 and releasing such case 2 to therefrom.

The attaching means component of the instant invention's wielding means preferably further comprise case re-orienting means which are connected operatively to the case 2 and to the cradle 48. As is depicted in FIGS. 1 and 2, the case re-orienting means preferably comprise a combination of the case's circular cross-sectional profile 2, its recesses or concavities 8, 10, and 12, and a ridge 56 which extends upwardly from floor of the concavity 50 of the cradle 48. By capturing the ridge 56, the recesses 12 mechanically resists any rotating movement, forward movement, or rearward movement of the case 2 with respect to the wheeled carriage 22, while the attachment bracket 52,54 resists any relative vertical movement of the case 2. Upon release of such bracket 52,54, the case 2 may be manually raised, and may be rotated 90° in either the clockwise or counter-clockwise direction for similar re-orienting engagements of recesses 8 or 10 with the ridge 56. Upon such rotating case re-orientation, attachment bracket 52,54 may be re-engaged in the configuration depicted in FIG. 1. The depicted recesses 8,10,12 and ridge 56 combination is intended as being representative of numerous other suitable mechanical fastening combinations which may hold the case 2 at varying angular orientations with respect to the wheeled carriage 22.

Referring to FIG. 2, a direct current electrical motor 58 is preferably housed within the interior 4 of the case 2, such motor 58 being supported by inwardly extending mounting columns 60. In a preferred embodiment, a rechargeable electric storage battery (not depicted within views) is similarly housed within the interior 4 of the case 2, such battery being positioned rearwardly from the motor 58 and forwardly from the case's rearward wall. Where such rechargeable electric storage battery is provided, the case's rearward wall preferably supports a battery recharging terminal 62 which may be electrically connected with a DC electric power source via an attachable and detachable plug 64 and an attached recharging electrical power line 66. A network of electrical power lines 68 electrically communicates with the electrical motor 58, the referenced electric storage battery, a first switch 70 supported on case's rear grip 18, and a second switch (not depicted within views) supported at the upper end of handle 26. Such network 68 preferably comprises an alternatively attachable and detachable plug and socket combination 72 which, upon attachment, facilitates switched on/off control of the motor 58 by the second switch at the upper end of the handle 46, and which upon detachment, activates on/off motor control via the first switch 70.

Referring further simultaneously to FIGS. 1 and 2, the electric motor 58 preferably includes a rotary drive output which comprises an axle 59 which extends forwardly from the motor 58 to engage a flexible drive axle (not depicted in views). Such flexible drive axle preferably extends through a hollow bore of a preferably provided tubular support shaft which is referred to generally by Reference Arrow 80. The proximal end of the tubular shaft 80 is preferably rigidly mounted upon the forward end of the case 2 by mounting member 14, and such shaft 80 preferably comprises a proximal forwardly extending portion 82, a distal 90° cantilevered portion 84, and a curved transition portion 86 spanning there between.

Referring further simultaneously to FIGS. 1 and 2, a conventional flexible line trimming head 88 is preferably rotatably mounted upon the extreme distal end of the tubular shaft 80, such trimmer head 88 supporting and rotatably moving flexible foliage trimming plastic lines 90. In a preferred embodiment, a protective shroud 92 is also provided at the distal end of the tubular shaft 80.

Referring simultaneously to FIGS. 1 and 2, an operator of the power tool 1 may rollably wield the case 2 along with its flexible line trimming components as described above, by grasping the hand grips at the upper end of the handle 46 and by rollably moving the complete power tool 1 along the ground. Upon depressing the second electrical switch at the upper end of such handle 46, the electric motor 58 is actuated for turning the trimmer head 88 and for rotatably moving lines 90 in a horizontal cutting swathe along the ground. During such rolling tool wielding motion, caster wheels 26 allow such operator to pivotally move the handle 46 leftwardly and rightwardly, resulting in counter-pivoting the wheeled carriage 22, and commensurate leftward and rightward movements of the trimmer head 88 for additional leftward and rightward motions of the horizontal cutting swathe.

In an alternative along the ground mode of operation of the power tool 1, the operator may release over center latch 54, may raise the case 2, and may rotate the case 90° in the counter-clockwise direction, causing the case's recess 8 to open downwardly, rather than leftwardly, as depicted in FIG. 2. Thereafter, the operator may replace the case 2 within the concavity 50 of the cradle 48, causing recess 8 to nestingly receive ridge 56. Thereafter, the operator may re-engage loop 52 and latch 54 for securely holding the case 2 upon the cradle 48. Upon such rotating reorientation of the case 2, the tubular shaft 80 commensurately re-orients rightwardly to extend the trimmer head 88 rightwardly from the mid-line of the deck 24, and to cause the rotational plane of the trimmer head 88 to extend substantially vertically. Upon such re-orienting of the case 2, the power tool 1 is advantageously re-configured for performing rolling curb edge or sidewalk edge grass trimming and cutting along a line situated rightwardly from the deck 24. Alternatively, a similarly executed clockwise re-orientation of the case 2 facilitates along the ground and rolling trimming at curb and sidewalk edges to the left of the deck 24.

Referring further simultaneously to FIGS. 1 and 2, the operator may further alternatively release latch 54, may detach plug 72, and may grasp handle grips 16 and 18 in the operator's left and right hands. Thereafter, the operator may actuate the motor 58 via the first on/off switch 70, and may directly manually wield the case 2 and rotary trimmer head 88 for trimming of above ground foliage such as hedges and bushes.

Referring to FIG. 2, the motor 58 is intended as being representative of all suitably substituted motor means including internal combustion engines.

Referring to FIG. 1, the rotary trimmer head 88 is intended as being representative of all suitable flexible line rotary trimmer heads, including continuous feed trimmer heads.

While the principles of the invention have been made clear in the above illustrative embodiment, those skilled in the art may make modifications in the structure, arrangement, portions and components of the invention without departing from those principles.

Accordingly, it is intended that the description and drawings be interpreted as illustrative and not in the limiting sense, and that the invention be given a scope commensurate with the appended claims.

I claim:

1. A power tool for facilitating an operator's alternative cutting of foliage over the ground and along the ground, the power tool comprising:
(a) a case;
(b) a tubular shaft having a distal end, the tubular shaft being fixedly attached to and extending forwardly from the case;
(c) a flexible line trimmer head mounted rotatably at the tubular shaft's distal end;
(d) motor means operatively housed within the case, the motor means having a rotary power output;
(e) an axle linking the flexible line trimmer head with the motor means' rotary power output, the axle extending through the tubular shaft; and
(f) wielding means comprising handle means connected operatively to case, the wielding means being adapted for alternatively facilitating manual movement of the case, tubular shaft, flexible line trimmer head, motor means and axle during the operator's over the ground foliage cutting, and facilitating rolling movement of the case, tubular shaft, flexible line trimmer head, motor means and axle during the operator's along the ground foliage cutting, and further comprising a wheeled carriage and attaching means, the attaching means being adapted for alternatively engaging with the case for securing the case upon the wheeled carriage for the operator's along the ground foliage cutting and releasing the case for the operator's above the ground foliage cutting.

2. The power tool of claim 1 wherein the attaching means comprises a cradle fixedly attached to the wheeled carriage, the cradle being fitted for nestingly receiving the case.

3. The power tool of claim 2 wherein the attaching means further comprises reorienting means adapted for alternatively securing the case at a plurality of orientations with respect to the wheeled carriage.

4. The power tool of claim 1 wherein the motor means comprises an electrical motor and an electrical storage battery.

5. The power tool of claim 1 wherein the handle means comprises handle attaching means and a pair of hand grips, the handle attaching means rigidly extending the hand grip pair from the case.

6. The power tool of claim 1 wherein the wheeled carriage comprises a deck and a plurality of wheels.

7. The power tool of claim 6 wherein the plurality of wheels comprises a pair of forward castor wheels.

8. The power tool of claim 7 further comprising height adjusting means operatively interconnecting the deck and the plurality of wheels.

9. The power tool of claim 8 wherein the wheeled carriage comprises an upwardly and rearwardly extending push handle.

10. The power tool of claim 9 wherein the motor means comprise an electric motor, and further comprising a pair of on/off switches connected operatively to the case's handle means and the wheeled carriage's push handle, and a network of electrical wires operatively interconnecting the electric motor and the pair of on/off switches.

11. The power tool of claim 1 wherein the flexible line trimmer head comprises a continuous feed flexible line trimmer head.

12. A power tool for facilitating an operator's alternative cutting of foliage over the ground and along the ground, the power tool comprising:
(a) a case;
(b) a tubular shaft having a distal end, the tubular shaft being fixedly attached to and extending forwardly from the case;
(c) a flexible line trimmer head mounted rotatably at the tubular shaft's distal end;
(d) motor means operatively housed within the case, the motor means having a rotary power output;
(e) an axle linking the flexible line trimmer head with the motor means' rotary power output, the axle extending through the tubular shaft; and
(f) wielding means comprising handle means connected operatively to case, the wielding means being adapted for alternatively facilitating manual movement of the case, tubular shaft, flexible line trimmer head, motor means and axle during the operator's over the ground foliage cutting, and facilitating rolling movement of the case, tubular shaft, flexible line trimmer head, motor means and axle during the operator's along the ground foliage cutting, the wielding means further comprising a wheeled carriage and attaching means, the attaching means being adapted for alternatively securing the case upon the wheeled carriage for the operator's along the ground foliage cutting and releasing the case for the operator's above the ground foliage cutting, the attaching means comprising a cradle fixedly attached to the wheeled carriage, the cradle being fitted for nestingly receiving the case, the attaching means further comprising reorienting means adapted for alternatively securing the case at a plurality of orientations with respect to the wheeled carriage, the case having a cylindrical outer surface, and the re-orienting means comprising the cylindrical outer surface in combination with a releasable latch, the releasable latch being adapted for holding the case at a selected orientation among the plurality of orientations.

13. The power tool of claim 12 wherein the case has a forward end, and wherein the tubular shaft has a proximal forwardly extending portion and a distal cantilevering portion.

14. Thr power tool of claim 13 wherein the wheeled carriage has a deck, the deck having a mid-line, a left side, and a right side, wherein the flexible line trimmer head has a rotary plane, and wherein the attaching means' adaptation for alternatively securing the case at a plurality of orientations facilitates first, second, and third orientations, the flexible line trimmer head's rotary plane being substantially vertical and displaced leftwardly from the wheeled carriage's mid-line upon positioning in the first orientation, said rotary plane being substantially vertical and displaced rightwardly from the wheeled carriage's mid-line upon positioning in the second orientation, and said rotary plane being substantially horizontal upon positioning in the third orientation.

15. The power tool of claim 14 wherein the attaching means' adaptation for alternatively securing the case at a plurality of orientations comprises ridge and recess combinations.

\* \* \* \* \*